United States Patent
Iwasaki

(10) Patent No.: US 9,649,561 B2
(45) Date of Patent: May 16, 2017

(54) RENDERING CONTROL APPARATUS, CONTROL METHOD THEREOF, RECORDING MEDIUM, RENDERING SERVER, AND RENDERING SYSTEM

(71) Applicant: SQUARE ENIX HOLDINGS CO., LTD., Tokyo (JP)

(72) Inventor: Tetsuji Iwasaki, Tokyo (JP)

(73) Assignee: SQUARE ENIX HOLIDINGS CO., LTD., Tokyo (JP)

( * ) Notice: Subject to any disclaimer, the term of this patent is extended or adjusted under 35 U.S.C. 154(b) by 194 days.

(21) Appl. No.: 14/183,840

(22) Filed: Feb. 19, 2014

(65) Prior Publication Data
US 2014/0168226 A1 Jun. 19, 2014

Related U.S. Application Data

(63) Continuation of application No. 13/453,212, filed on Apr. 23, 2012, now Pat. No. 8,698,813.
(Continued)

(30) Foreign Application Priority Data

Nov. 29, 2011 (JP) ................ 2011-260976

(51) Int. Cl.
*G06F 15/00* (2006.01)
*A63F 13/355* (2014.01)
(Continued)

(52) U.S. Cl.
CPC ............ *A63F 13/355* (2014.09); *A63F 13/12* (2013.01); *A63F 13/30* (2014.09); *A63F 13/35* (2014.09);
(Continued)

(58) Field of Classification Search
None
See application file for complete search history.

(56) References Cited

U.S. PATENT DOCUMENTS 6,720,970 B2 4/2004 Nagoya
6,734,852 B2 5/2004 Sowizral et al.
(Continued)

FOREIGN PATENT DOCUMENTS

CN 101369345 2/2009
JP 11-091211 4/1999
(Continued)

OTHER PUBLICATIONS

International Search Report and Written Opinion of the International Searching Authority in International Application No. PCT/JP2012/062720, dated Jun. 12, 2012.
(Continued)

*Primary Examiner* — Xiao Wu
*Assistant Examiner* — Mohammad H Akhavannik
(74) *Attorney, Agent, or Firm* — Greenblum & Bernstein, P.L.C.

(57) ABSTRACT

For each of a plurality of rendering objects to be used to generate a screen to be provided for a client device, identification information and detailed information indicating data necessary for rendering are acquired. By referring to detailed information of each of the plurality of rendering objects, the rendering order of all the rendering objects is determined so as to allocate consecutive ordinal numbers to rendering objects having at least partial data indicated by detailed information in common. A rendering control apparatus transfers data, indicated by detailed information of a rendering object in accordance with the rendering order, to a GPU. In this process, among data indicated by detailed information of rendering objects which are continuous in the
(Continued)

rendering order, only data which is not the same as data already transferred to the GPU is read out and transferred.

11 Claims, 9 Drawing Sheets

Related U.S. Application Data

(60) Provisional application No. 61/489,761, filed on May 25, 2011.

(51) Int. Cl.

| | | |
|---|---|---|
| *A63F 13/30* | (2014.01) | |
| *A63F 13/63* | (2014.01) | |
| *A63F 13/35* | (2014.01) | |
| *A63F 13/655* | (2014.01) | |
| *A63F 13/52* | (2014.01) | |
| *G06T 1/20* | (2006.01) | |
| *G06T 15/00* | (2011.01) | |
| *A63F 13/213* | (2014.01) | |

(52) U.S. Cl.
CPC .............. *A63F 13/52* (2014.09); *A63F 13/63* (2014.09); *A63F 13/655* (2014.09); *G06T 1/20* (2013.01); *G06T 15/005* (2013.01); *A63F 13/213* (2014.09); *A63F 2300/538* (2013.01); *A63F 2300/5593* (2013.01); *A63F 2300/6615* (2013.01); *A63F 2300/6661* (2013.01)

(56) References Cited

U.S. PATENT DOCUMENTS

| | | | |
|---|---|---|---|
| 8,154,553 B2 | 4/2012 | Peterfreund | |
| 2002/0033831 A1 | 3/2002 | Nagoya | |
| 2002/0063704 A1 | 5/2002 | Sowizral et al. | |
| 2005/0104889 A1* | 5/2005 | Clemie | G06T 9/00 345/522 |
| 2007/0013694 A1 | 1/2007 | Gold et al. | |
| 2007/0252841 A1 | 11/2007 | Kim | |
| 2008/0278482 A1 | 11/2008 | Farmanbar et al. | |
| 2009/0201303 A1* | 8/2009 | Westerhoff | G06F 3/14 345/520 |
| 2009/0278842 A1 | 11/2009 | Peterfreund | |
| 2009/0289945 A1 | 11/2009 | Peterfreund | |
| 2010/0245858 A1 | 9/2010 | Nguyen et al. | |
| 2012/0172125 A1 | 7/2012 | Kim | |

FOREIGN PATENT DOCUMENTS

| | | |
|---|---|---|
| JP | 2000-285255 | 10/2000 |
| JP | 2000-348207 | 12/2000 |
| JP | 2001-075759 | 3/2001 |
| JP | 2001-331792 | 11/2001 |
| JP | 2003-208633 | 7/2003 |
| JP | 2004-258264 | 9/2004 |
| JP | 2006-252292 | 9/2006 |
| JP | 2009-132082 | 6/2009 |
| JP | 2010-238235 | 10/2010 |
| WO | 00/75873 | 12/2000 |
| WO | 2006/001629 | 1/2006 |
| WO | 2007/004837 | 1/2007 |
| WO | 2007/067131 | 6/2007 |
| WO | 2009/138878 | 11/2009 |

OTHER PUBLICATIONS

Office Action from the State Intellectual Property Office of P.R. China in Chinese Patent Application No. 201280002592.X, dated Nov. 21, 2014, together with an English language translation thereof.

Office Action from Japan Patent Office (JPO) in Japanese Pat. Appl. No. 2012-170334, dated Nov. 13, 2015, together with a partial English language translation.

Office Action from Japan Patent Office (JPO) in Japanese Patent Appl. No. 2012-170334, dated May 6, 2016, together with a partial English language translation.

Office Action from Japan Patent Office (JPO) in Japanese Patent Appl. No. 2015-040655, dated Feb. 1, 2016, together with a partial English language translation.

Partial Supplementary European Search Report from European Patent Office (EPO) in European Patent Application No. 12756343.5, dated Apr. 13, 2016.

* cited by examiner

FIG. 9

|   | A-2 | B-1 | B-2 | C-1 | C-2 |
|---|---|---|---|---|---|
| A-1 | 0 | 3 | 2 | 2 | 3 |
|   | A-2 | 0 | 1 | 0 | 0 |
|   |   | B-1 | 2 | 2 | 3 |
|   |   |   | B-2 | 2 | 2 |
|   |   |   |   | C-2 | 2 |

RENDERING CONTROL APPARATUS, CONTROL METHOD THEREOF, RECORDING MEDIUM, RENDERING SERVER, AND RENDERING SYSTEM

CROSS REFERENCE TO RELATED APPLICATIONS

This is a continuation application of U.S. patent application Ser. No. 13/453,212, filed Apr. 23, 2012, which claims the priority benefit of U.S. Provisional Patent Application No. 61/489,761, filed May 25, 2011, and claims the priority benefit under 35 U.S.C. §119 of Japanese Patent Application No. 2011-260976, filed on Nov. 29, 2011. The disclosures of each of these documents, including the specifications, drawings, and claims, are incorporated herein by reference in their entireties.

BACKGROUND OF THE INVENTION

Field of the Invention

The present invention relates to a rendering control apparatus, a control method thereof, a recording medium, a rendering server, and a rendering system and, more particularly, to a technique of providing a rendered screen for a client device connected to a network.

Description of the Related Art

Client devices such as personal computers (PCs) connectable to networks are widely used. With the spread of these devices, the network population of the Internet is increasing. Recently, various services using the Internet have been developed for network users, and entertainment services such as games are also provided.

One of these services for the network users is a massively multiplayer type network game such as an MMORPG (Massively Multiplayer Online Role-Playing Game). In this massively multiplayer type network game, a user can perform a match-up play or team play with another user using a client device connected to a server for providing the game, by connecting his or her client device to the server.

In a general massively multiplayer type network game, a client device exchanges the data necessary to render the game with a server. The client device executes a rendering process by using received data necessary for rendering, and displays a generated game screen on a display device connected to the client device, thereby providing the user with the game screen. Also, information input by the user by operating an input interface is transmitted to the server, and used in calculation processing in the server, or transmitted to another client device connected to the server.

Unfortunately, some network games that perform a rendering process on a client device as described above require each user to use a PC having sufficient rendering performance or a dedicated game machine. Accordingly, the number of users of a network game (one content) depends on the number of users who own devices meeting the performance required by the content. That is, it is difficult to increase the number of users of a game requiring high rendering performance such as a game that provides beautiful graphics.

In contrast, as described in an International Publication No. 2009/138878, a game that a user can play without depending on the processability such as the rendering performance of a client device has recently been provided.

In the game as described in the International Publication No. 2009/138878, a server acquires information of an operation performed on a client device, and provides a client device with a game screen obtained by executing a rendering process by using the information. That is, when performing the rendering process on the server in response to an operation performed on the client device, it is necessary to increase the response speed, that is, rapidly provide a game screen reflecting the operation, in order to allow a user to play the game without any stress.

Especially in a massively multiplayer type network game, a server simultaneously generates game screens to be provided for a plurality of client devices. Therefore, it is desirable to reduce the time required for the rendering process of the plurality of game screens. However, the International Publication No. 2009/138878 does not mention any practical method of increasing the efficiency of the game screen rendering process.

SUMMARY OF THE INVENTION

The present invention has been made in consideration of the problem of the prior art as described above. The present invention provides a method of performing an efficient rendering process having high responsiveness, in a rendering system that provides a game screen for one or more client devices.

The present invention in its first aspect provides a rendering control apparatus comprising: an acquisition unit configured to acquire information of a plurality of rendering objects to be used to generate a screen to be provided for a client device, and store the information in a storage unit, wherein the information of each rendering object includes identification information of the rendering object, and detailed information indicating data necessary to render the rendering object; a determination unit configured to refer to detailed information of each of the plurality of rendering objects acquired by the acquisition unit, and determine a rendering order of the plurality of rendering objects; and a transfer unit configured to acquire identification information of a rendering object in accordance with the rendering order determined by the determination unit, read out data indicated by detailed information of a rendering object corresponding to the identification information from a data storage unit, and transfer the data to a rendering unit configured to generate a screen by sequentially rendering the plurality of rendering objects, wherein the determination unit allocates consecutive ordinal numbers as a rendering order of the rendering objects, to the plurality of rendering objects, which have at least partial data indicated by detailed information in common, and when performing rendering in accordance with the rendering order, the transfer unit reads out, from the data storage unit, data which is not the same as data already transferred to the rendering unit, among the data indicated by the detailed information of the rendering objects which are continuous in the rendering order, and transfers the readout data.

Further features of the present invention will become apparent from the following description of exemplary embodiments (with reference to the attached drawings).

BRIEF DESCRIPTION OF THE DRAWINGS

FIG. 9 is another view for explaining the rendering order determination process according to the embodiment of the present invention;

DESCRIPTION OF THE EMBODIMENTS

First Embodiment

Exemplary embodiments of the present invention will be explained in detail below with reference to the accompanying renderings. Note that an embodiment to be explained below is an example of a rendering system in which the present invention is applied to a center server capable of accepting the connection of one or more client devices, and a rendering server capable of simultaneously generating screens to be provided for one or more client devices. However, the present invention is applicable to an arbitrary apparatus and arbitrary system capable of simultaneously forming screens to be provided for one or more client devices.

In this specification, "a service" provided for a client device by the center server is a massively multiplayer type network game as described above. In the rendering system, the rendering server generates a game screen to be provided for a client device, and the game screen is distributed to the client device via the center server. However, the rendering system need not always provide a service like this, and need only have an arrangement that renders and distributes a screen to a client device.

<Arrangement of Rendering System>

Figure 1:
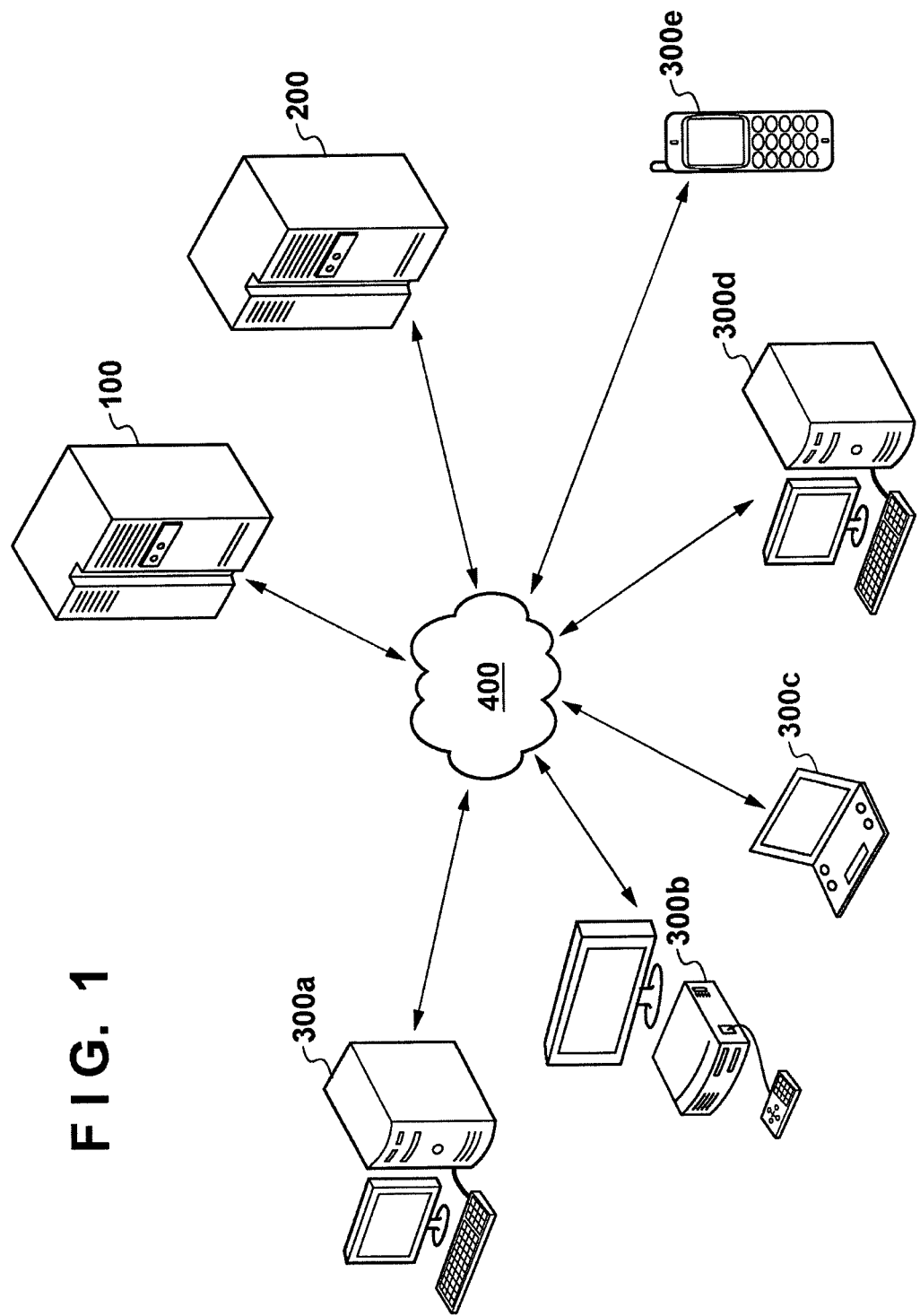
FIG. 1 is a view showing the system arrangement of a rendering system according to an embodiment of the present invention.

FIG. 1 is a view showing the system arrangement of a rendering system according to the embodiment of the present invention.

As shown in FIG. 1, client devices 300a to 300e for receiving a provided service and a center server 200 for providing the service are connected across a network 400 such as the Internet. Likewise, a rendering server 100 for rendering a screen to be provided for the client device 300 is connected to the center server 200 across the network 400. Note that in the following explanation, "the client device 300" indicates all the client devices 300a to 300e unless otherwise specified.

The client device 300 is not limited to, e.g., a PC, home game machine, or portable game machine, and may be an device such as a cell phone, PDF, or tablet. In the rendering system of this embodiment, the rendering server 100 generates a game screen corresponding to operation input caused on a client device, and the center server 200 distributes the screen to the client device 300. Accordingly, the client device 300 need not have any rendering function of generating a game screen. That is, the client device 300 need only be an apparatus including a user interface for detecting operation input and a display device for displaying a screen, or an apparatus connectable to the user interface and display device and capable of displaying a received game screen on the display device. That is, since a rendering process of generating a game screen uses more hardware resources than those to be used by a process of decoding a video stream, the present invention provides a game independent of the rendering performance of a client device by transmitting a game screen generated by a server to the client device.

The center server 200 executes and manages a game processing program, instructs the rendering server 100 to perform a rendering process, and exchanges data with the client device 300. More specifically, the center server 200 executes game processing of a massively multiplayer type network game as a service to be provided for the client device 300.

The center server 200 manages information such as the position and direction on a map of a character operated by the user of each client device, and an event to be provided for each character. The center server 200 causes the rendering server 100 to generate a game screen corresponding to the state of a character being managed. For example, when information of operation input caused by the user on each connected client device is input across the network 400, the center server 200 executes a process of reflecting this information on information of a character being managed. Then, the center server 200 determines a rendering object to be rendered on the game screen based on the character information reflecting the information of operation input, and transmits a rendering instruction to the rendering server 100.

The rendering server 100 is a server for executing a rendering process, and includes four GPUs in this embodiment as will be described later. The rendering server 100 renders a game screen in accordance with the rendering instruction received from the center server 200, and outputs the generated game screen to the center server 200. Note that the rendering server 100 can simultaneously form a plurality of game screens. Based on information received from the center server 200 for each game screen, that is, identification information of rendering objects contained in the game screen, and detailed information indicating data necessary to render each rendering object, the rendering server 100 executes a game screen rendering process by a GPU.

In this embodiment, "detailed information indicating data necessary to render a rendering object" contains information indicating the following attribute data.

Identification information for specifying model data
Identification information for specifying texture data
Specific information of a rendering program (for example, a shader) to be used
Specific information of data for calculations (for example, the light source intensity, light source vector, and rotation matrix) to be used in the rendering program Note that the detailed information containing the above-mentioned information is transmitted from the center server 200 to the rendering server 100 in this embodiment, but information to be contained in the detailed information is not limited to the above information. For example, the detailed information may contain at least one of the five pieces of information described above, and may also contain information to be used in the process of rendering a rendering object in addition to the above information. Note also that in the following explanation, the data for calculations contains numerical values such as a constant and variable to be used in a calculation in the rendering process.

The center server 200 distributes the game screen, which is received from the rendering server 100 in accordance with the transmitted rendering instruction including the rendering object identification information and detailed information, to a corresponding client device. Thus, the rendering system of this embodiment can generate a game screen corresponding to operation input caused on a client device, and provide the game screen to the user via the display device of the client device.

Note that the rendering system of this embodiment includes one rendering server 100 and one center server 200, but the present invention is not limited to this arrangement. For example, it is also possible to allocate one rendering server 100 to a plurality of center servers 200, or allocate a plurality of rendering servers 100 to a plurality of center servers 200. The center server 200 can also designate a rendering server 100 or a GPU of a rendering server 100 to be used to execute a rendering instruction, in accordance with information indicating the number of game screens simultaneously generated by a rendering server 100 or each GPU of a rendering server 100.

<Arrangement of Rendering Server 100>

Figure 2:
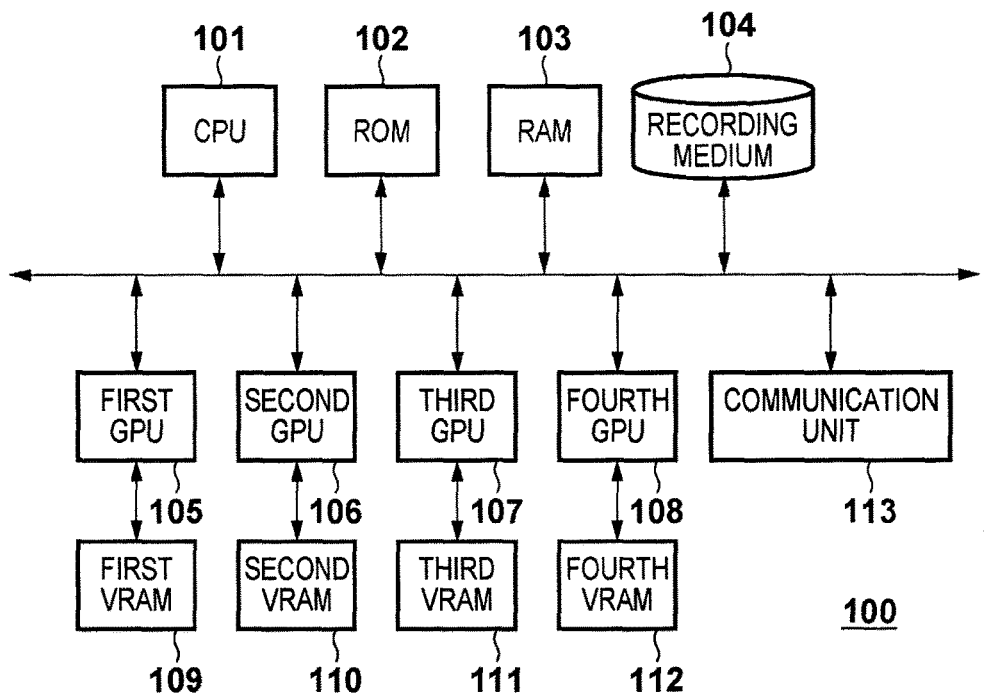
FIG. 2 is a block diagram showing the functional arrangement of a rendering server 100 according to the embodiment of the present invention.

FIG. 2 is a block diagram showing the functional arrangement of the rendering server 100 according to the embodiment of the present invention.

A CPU 101 controls the operation of each block of the rendering server 100. More specifically, the CPU 101 reads out a rendering process operation program stored in a ROM 102 or recording medium 104, expands the program on a RAM 103, and executes the program, thereby controlling the operation of each block.

The ROM 102 is, for example, a programmable nonvolatile memory. The ROM 102 stores the rendering process operation program, other operation programs, and information such as a constant required for the operation of each block of the rendering server 100.

The RAM 103 is a volatile memory. The RAM 103 is used not only as an operation program expansion area, but also as a storage area for temporarily storing, for example, intermediate data output during the operation of each block of the rendering server 100.

The recording medium 104 is, for example, a recording device such as an HDD detachable from the rendering server 100. In this embodiment, the recording medium 104 stores the following data to be used to generate a screen in the rendering process.

Model data
Texture data
Rendering program
Data for calculations to be used in the rendering program A communication unit 113 is a communication interface of the rendering server 100. The communication unit 113 exchanges data with another apparatus, for example, the center server 200 connected across the network 400. When transmitting data, the communication unit 113 converts the data into a data transmission format determined with respect to the network 400 or a transmission destination apparatus, and transmits the data to the transmission destination apparatus. When receiving data, the communication unit 113 converts data received across the network 400 into an arbitrary data format readable by the rendering server 100, and stores the data in, for example, the RAM 103.

First, second, third, and fourth GPUs 105, 106, 107, and 108 each generate a game screen to be provided for the client device 300 in the rendering process. Each GPU is connected to a video memory (one of first, second, third, and fourth VRAMs 109, 110, 111, and 112) as a game screen rendering area. Also, each GPU includes a cache memory. When performing rendering on the connected VRAM, each GPU expands a rendering object on the cache memory, and writes the mapped rendering object in the corresponding VRAM. Note that one video memory is connected to one GPU in this embodiment, but the present invention is not limited to this. That is, the number of video memories connected to the GPU can be any arbitrary number.

<Arrangement of Center Server 200>

Figure 3:
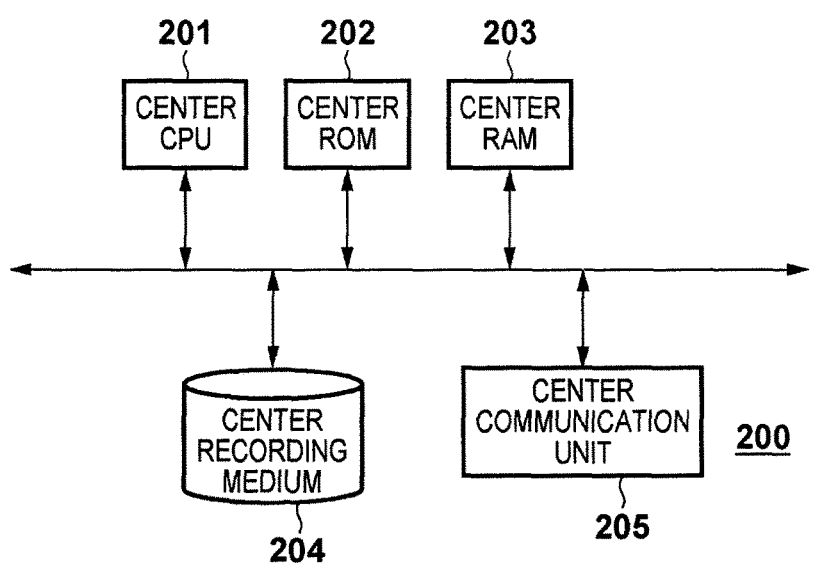
FIG. 3 is a block diagram showing the functional arrangement of a center server 200 according to the embodiment of the present invention.

The functional arrangement of the center server 200 of this embodiment will be explained below. FIG. 3 is a block diagram showing the functional arrangement of the center server 200 according to the embodiment of the present invention.

A center CPU 201 controls the operation of each block of the center server 200. More specifically, the CPU 201 reads out a game processing program from, for example, a ROM 202 or center recording medium 204, expands the program on a center RAM 203, and executes the program, thereby controlling the operation of each block.

The center ROM 202 is, for example, a programmable nonvolatile memory. The center ROM 202 stores the game processing program, and may also store other programs. The center ROM 202 also stores information such as a constant required for the operation of each block of the center server 200.

The center RAM 203 is a volatile memory. The center RAM 203 is used not only as a game processing program expansion area, but also as a storage area for temporarily storing, for example, intermediate data output during the operation of each block of the center server 200.

The center recording medium 204 is, for example, a recording device such as an HDD detachable from the center server 200. In this embodiment, the center recording medium 204 is used as, for example, a database for managing users and client devices using the game, and a database for managing various kinds of information on the game, which are required to generate a game screen to be provided for each connected client device.

The center communication unit 205 is a communication interface of the center server 200. The center communication unit 205 exchanges data with the rendering server 100 and client device 300 connected across the network 400. Note that the center communication unit 205 converts data into a data format complying with the communication specifications, like the communication unit 113.

<Game Processing>

Figure 4:
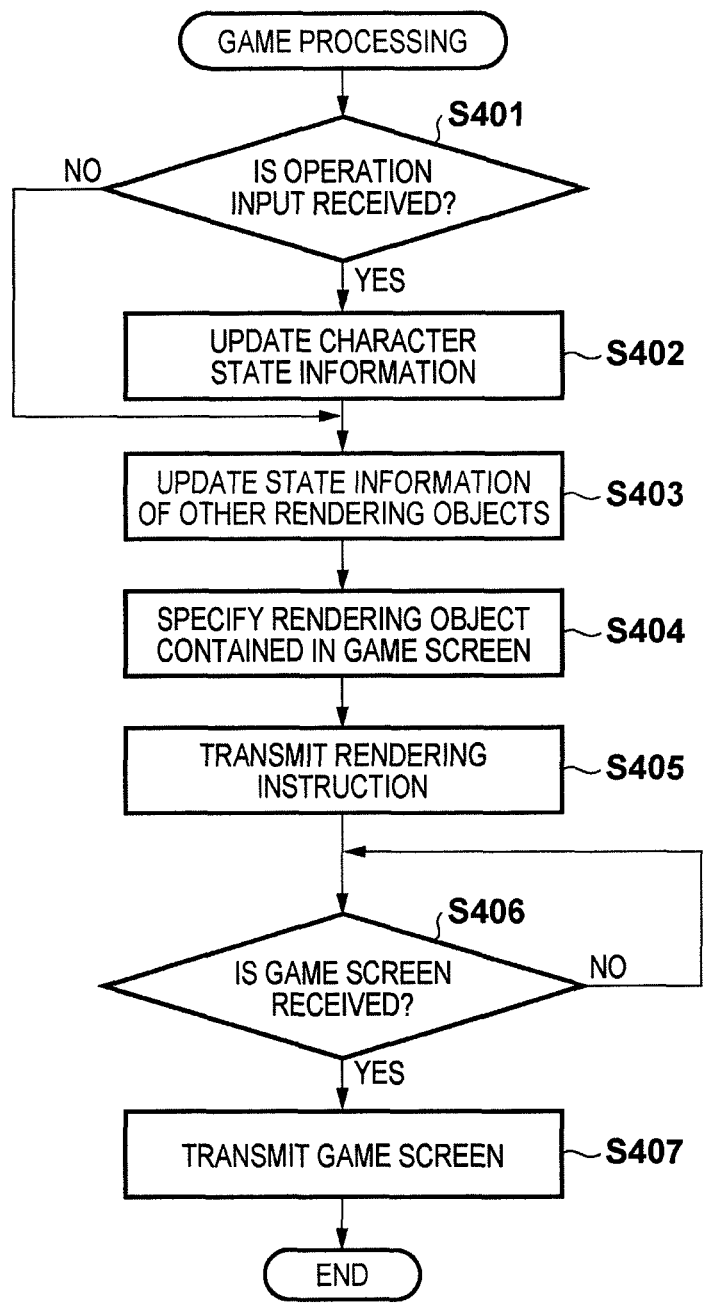
FIG. 4 is a flowchart showing an example of game processing of the center server 200 according to the embodiment of the present invention.

Practical processing of basic game processing executed on the center server 200 of the rendering system of this embodiment having the arrangement as described above will be explained below with reference to a flowchart shown in FIG. 4. Processing corresponding to this flowchart can be implemented by the center CPU 201 by reading out a corresponding processing program stored in, for example, the center recording medium 204, expands the program on the center RAM 203, and executes the program.

Note that this game processing is started when, for example, the center server 200 is activated, and repetitively executed for each frame of a provided game. Note also that in the following explanation, the client devices 300a to 300e are already connected to the center server 200. In this game processing, the center server 200 provides a game screen for each client device.

In step S401, the center CPU 201 determines whether information indicating operation input caused on each client device 300 is received. More specifically, the center CPU 201 determines whether information received by the center communication unit 205 and stored in the center RAM 203 is information indicating operation input caused on the client device 300.

Figure 5A:
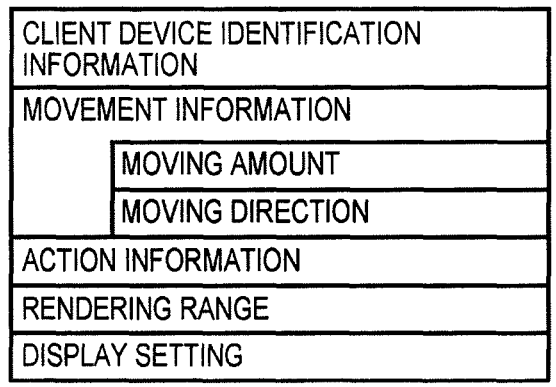
FIGS. 5A and 5B are views showing examples of the data structures of operation input information and a rendering instruction according to the embodiment of the present invention.

The information indicating operation input caused on the client device 300 may have, for example, a data structure as shown in FIG. 5A. As shown in FIG. 5A, the operation input information of this embodiment contains, for example, identification information (for example, an IP address and user identification information) of a client device on which operation input is caused a moving amount and moving direction input by the operation identification information of a selected action rendering range of a game screen (for example, a camera parameter)

the display setting (for example, the screen display resolution and the number of colors) of the display device of the client device Note that the data structure of the information received by the center server 200 as operation input caused on each client device 300 is not limited to this, and may also be a data structure predetermined by the game.

In this embodiment, information obtained by converting an operation caused on the client device 300 by the user or the like into a numerical value or parameter in the game is transmitted to the center server 200. However, the present invention is not limited to this. That is, the operation input information may also be information indicating an input signal detected by a client device by operating a button or the like by the user. In this case, the process of conversion into a numerical value or parameter in the game need only be performed in accordance with the information indicating the input signal received by the center CPU 201, and the type of client device.

If the center CPU 201 determines that the information indicating operation input caused on the client device 300 is received, the center CPU 201 advances the process to step S402; if not, the center CPU 201 advances the process to step S403.

In step S402, the center CPU 201 updates game information based on the information indicating operation input on the client device 300, which is received in step S401. More specifically, the center CPU 201 reads out, from the center recording medium 204, state information corresponding to a character in the game, which is an operation target of the user of the corresponding client device 300. The character state information is information of the action and appearance of the character that can be changed by a user's operation, for example, the position (coordinate information) of the character on the map, the gazing direction of the character, and a character's action.

The center CPU 201 refers to the received operation input information, and updates a parameter that changes by operation input, among parameters contained in the state information, by the received operation input information. Accordingly, the center CPU 201 can reflect, on the game, the information of operation input caused on the client device 300.

Note that of the information of operation input on the client device 300 received in step S401, the center CPU 201 associates information that is not used to update the character state information with the client device identification information, and records the information on the center recording medium 204.

In step S403, the center CPU 201 updates state information of a rendering object as a state management target in the game, except for the character as an operation target of the user of each client device 300. Examples of the rendering object as a state management target in the game are a character called an NPC (Non Player Character) that is not a target of a user's operation, and a background object such as a landform. A rendering object as a state management target in the game changes with time or by the action of a character as a user's operation target. In step S403, therefore, the center CPU 201 updates the state information of a rendering object as a state management target in the game, in accordance with the elapse of time or the character state information updated in step S402.

In step S404, the center CPU 201 specifies rendering objects contained in the game screen provided for each client device 300. The rendering objects contained in the game screen are an above-described rendering object as a state management target in the game, and a character's rendering object as a user's operation target.

More specifically, the center CPU 201 selects each client device 300 presently connected to the center server 200, and reads out, from the center recording medium 204, information of the game screen rendering range with which the identification information of the client device 300 is associated. As described above, the information of the game screen rendering range contains camera parameters corresponding to the game screen. The center CPU 201 refers to the camera parameters, and specifies, as a rendering object contained in the game screen, a rendering object such as a character whose state information contains coordinate information included in the camera's rendering range. Note that identification information is assigned to a rendering object, and the center CPU 201 associates the identification information of the specified rendering object contained in the game screen with the identification information of the client device, and records the information on the center recording medium 204.

In step S405, the center CPU 201 transmits, to the rendering server 100, an instruction to render game screens to be provided for all the client devices 300, and causes the rendering server 100 to execute the rendering process. More specifically, the center CPU 201 first reads out the identification information, which is recorded on the center recording medium 204 in association with the identification information of each client device 300, of the rendering object contained in the game screen to be provided for the client device 300. The center CPU 201 also reads out, from the center recording medium 204, the detailed information set for each rendering object contained in the game screen. Then, the center CPU 201 associates the identification information of the rendering objects contained in the game screen to be provided for each client device 300, and the detailed information of each rendering object, with the identification information of the client device 300, and transmits the information as a rendering instruction to the center server 200 via the center communication unit 205. At the same time, the center CPU 201 reads out, from the center recording medium 204, the information of rendering range of the game screen and the display setting information of the display device of each client device, which are associated with the identification information of the client device, and transmits the readout information to the rendering server 100.

Figure 5B:
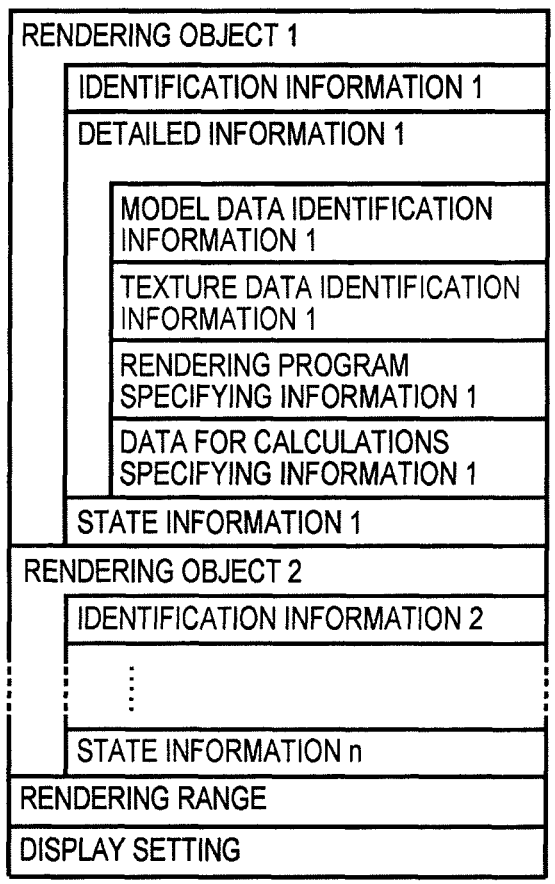

That is, as shown in FIG. 5B, the rendering instruction transmitted to the center server 200 in order to render a game screen to be provided for one client device contains identification information of each rendering object contained in the game screen detailed information of each rendering object contained in the game screen state information of each rendering object contained in the game screen information of the rendering range and display setting of the game screen associated with the identification information of the client device. Note that if the game is, for example, a game in which the camera position remains unchanged or a game having a fixed display resolution, information such as the camera parameters and display setting indicating the game screen rendering range need not be contained in the rendering instruction.

Note that in this embodiment, the rendering instruction is transmitted to the rendering server 100 for each client device 300. However, it will readily be understood that it is also possible to simultaneously transmit rendering instructions for a plurality or all of the client devices 300.

In step S406, the center CPU 201 determines whether the game screen generated by the rendering server 100 in accordance with the rendering instruction is received from the rendering server 100. More specifically, the center CPU 201 determines whether the center communication unit 205 has received the game screen generated and output by the rendering server 100 for each client device 300. If it is determined that the game screen is received, the center CPU 201 advances the process to step S407; if not, the center CPU 201 repeats the processing of this step. That is, the center CPU 201 waits in this step until the game screen of each client device 300 is received.

Note that the game screen received in this step is preferably a game screen generated based on the rendering instruction transmitted to the rendering server 100 in step S404 as an immediately preceding step, but the game screen is not limited to this. That is, this game processing is executed for each frame. Therefore, if rendering of the game screen is not complete within one frame time defined by the frame rate of the provided game, the game screen received in this step may also be a screen generated in accordance with a rendering instruction transmitted in a frame preceding the present frame by a few frames.

In step S407, the center CPU 201 distributes the game screen received in step S406 to the corresponding client device 300. More specifically, the center CPU 201 refers to identification information of the client device 300 contained in, for example, the header of the game screen received by the center communication unit 205 and stored in the center RAM 203. Then, the center CPU 201 transmits the game screen to the client device 300 indicated by the identification information via the center communication unit 205, and completes this game processing.

As described above, the center server 200 can generate a game screen reflecting operation input caused on each client device 300, and distribute the obtained game screen to the client device 300, by transmitting the rendering instruction to the rendering server 100.

Depending on the number of client devices 300 or the number of rendering objects included in the rendering range, however, it takes a long time to generate a game screen reflecting operation input caused on each client device 300. This may give the user of the client device 300 an impression that the response of the game is low. In this embodiment, a method of shortening the time required for the rendering process in the rendering server 100 by determining the rendering object detailed information contained in the rendering instruction as follows will be explained below.

The rendering process is performed by reading out, for each rendering object, "identification information for specifying model data", "identification information for specifying texture data", "specific information of a rendering program", and "data for calculations to be used in the rendering program" contained in the detailed information. That is, when a plurality of rendering objects are contained in the game screen, each rendering object is selected, detailed information is read out, and rendering is performed in accordance with the detailed information. After that, rendering for the next rendering object is performed. That is, whenever rendering objects to be rendered are switched during the rendering process, the rendering server 100 executes processes pertaining to initialization, for example, transfers model data and texture data to a CPU, converts the data, reads out a rendering program, and sets data for calculations. In the rendering process for one game screen, therefore, the processing time (switching cost) for initialization for rendering one rendering object is required for the number of rendering objects included in the rendering range of the game screen. The switching cost further increases when simultaneously generating game screens to be distributed to a plurality of client devices 300.

On the other hand, in the generation of a game screen, rendering objects having at least partial data indicated by the detailed information in common sometimes exist particularly in, for example, the background. For example, objects such as trees contained in the game screen are rendered by using one texture data for a few patterns of model data. Also, the same rendering program and the same data for calculations are used for, for example, objects having the same material or texture, or objects existing under the same light source. Furthermore, if the camera positions and directions on the map in the game are similar in game screens to be provided for different client devices, it is highly likely that common rendering objects exist in the rendering range and the same detailed information is used.

This embodiment reduces the switching cost during the rendering process by allocating consecutive ordinal numbers as a rendering order to rendering objects having at least partial data indicated by detailed information in common as described above. That is, when switching rendering objects to be rendered, the time required for common processing is shortened by using the result of a calculation performed on a rendering object rendered in front or data read out for it, thereby reducing the switching cost.

<Rendering Process>

Figure 6:
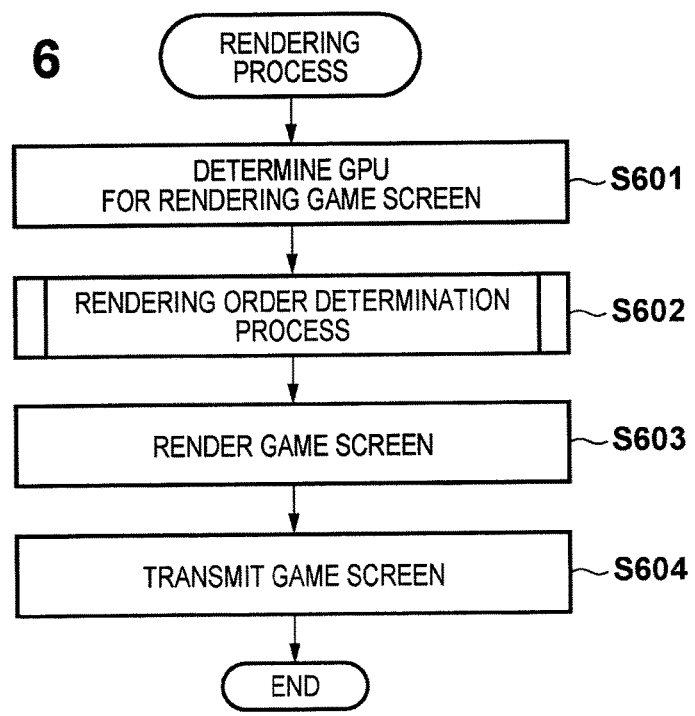
FIG. 6 is a flowchart showing an example of a rendering process of the rendering server 100 according to the embodiment of the present invention.

Practical processing of the rendering process of the rendering server 100 of this embodiment will be explained below with reference to a flowchart shown in FIG. 6. Processing corresponding to this flowchart can be implemented by the CPU 101 by reading out a corresponding processing program stored in, for example, the ROM 102, and executing the program by expanding it on the RAM 103. Assume that this rendering process is started when, for example, the rendering instruction from the center server 200 is received. Note that in the following explanation, the rendering server 100 generates game screens to be provided for the five client devices 300a to 300e in the same manner as in the above-described game processing.

In step S601, the CPU 101 classifies the generation of game screens to be provided for the client devices 300a to 300e to the GPUs of the rendering server 100. That is, in this step, the CPU 101 determines a GPU to be used to process the received rendering instruction, from the first, second, third, and fourth GPUs 105, 106, 107, and 108.

Examples of the method of classifying client devices as game screen generation targets to be allocated to one GPU are as follows.

1. Camera Parameter (Rendering Range) Defining Game Screen

The game screen rendering range (visual field) is defined by a camera parameter for a game screen to be provided for each client device 300. The visual field of one camera is normally defined by a quadrangular pyramid or truncated quadrangular pyramid. Game screens in which the visual fields overlap each other presumably contain the same rendering object. Therefore, the efficiency of the rendering process can be increased by classifying client devices as game screen generation targets to be allocated to the same GPU, by taking account of the overlap of the visual fields. More specifically, a triangle obtained by projecting a quadrangular pyramid defined by the visual field onto a two-dimensional plane is calculated in accordance with the coordinates and direction of a camera defining a game screen to be provided for each client device, game screens in which the triangular ranges overlap each other by a predetermined ratio or more are classified as one group, and the rendering process of the group is allocated to the same GPU.

Simply, client devices having close camera coordinates defining game screens are expected to have similar game screen rendering contents. Accordingly, game screens in each of which the distance between camera coordinates defining the game screen falls within a predetermined distance may be classified into one group, and the rendering process of the group may be allocated to the same GPU.

Also, an area using the same background object such as a mountain, wood, or sea exists on the map in a game. That is, when the camera coordinates defining a game screen exist in a specific area in which this background object is arranged, or when the camera direction is the direction of this specific area, generated game screens contain a common background object. Therefore, the efficiency of the rendering process can be increased by classifying game screens containing a common background object into one group, and allocating the rendering process of the group to the same GPU.

Furthermore, the same rendering object may be used as a background in various areas on the map in a game. That is, even when the camera coordinates and directions defining game screens are different, the same background object may be included in the rendering range. Accordingly, the camera positions or the like in game screens to be generated by one GPU need not always be close.

As information of a GPU to be allocated, information predetermining a GPU for performing the rendering process may be recorded as a lookup table on the recording medium 104, for a combination of, for example, the camera coordinates and direction information. As the information of a GPU to be allocated, information of a GPU for performing processing may also be obtained by, for example, a function using the values of the camera position and direction as arguments.

2. Combination of Detailed Information of Rendering Objects Included in Rendering Range The switching cost in the rendering process reduces as the coincidence of detailed information of rendering objects having consecutive ordinal numbers as a rendering order increases. Therefore, the CPU 201 refers to the detailed information of all rendering objects contained in each of game screens to be provided for all the client devices 300, and calculates the coincidence of rendering objects between the game screens on a detailed information level. The CPU 201 then classifies the generation of game screens having a high coincidence into one group, and allocates the rendering process of the group to the same GPU.

Note that the coincidence of detailed information can also be obtained as the similarity of a distribution formed for rendering objects contained in each game screen, based on a combination of, for example, texture data and model data in detailed information. It is also possible to classify rendering objects contained in each game screen based on specific attribute data indicated by detailed information, and, for only classification in which the number of rendering objects belonging to each set is equal to or larger than a threshold value, compare detailed information in a round robin manner between game screens, thereby calculating the coincidence of the detailed information.

3. Presence/Absence of Participation of Character as User's Operation Target in Event When a specific condition is met in a game, for example, when an object exists in a specific point on the map in a game, an event may occur and the game screen may forcedly be changed to a screen different from a normal one. For example, in a combat event against an enemy character or the like, a character as a user's operation target fights the enemy character in a dedicated battlefield. Since events like this may simultaneously occur in arbitrary positions on the map, the switching cost can be reduced by classifying game screens to be provided for client devices 300 on which events of the same kind have occurred into one group, and allocating the rendering process of the group to the same GPU.

4. Progress Status of Game

For a game of a kind in which the progress of a story is determined, the types of objects to be rendered may be limited in accordance with the progress status of the game. For example, in a story in which the field changes like the inside of a building→an open space→a grassy plain→a forest, it is possible to classify groups whenever the field changes, and allocate game screen rendering to different GPUs.

As described above, rendering objects contained in a game screen are classified into a plurality of groups having similar rendering contents by using the similarity of the rendering objects as a determination criterion, and the rendering of game screens of each group is allocated to the same GPU. Then, a rendering order determination process (to be described later) is executed. This allows each GPU to generate a game screen more efficiently. Note that the aforementioned method of determining a GPU for generating a game screen to be provided for the client device 300 is merely an example. Accordingly, it is also possible to use a method capable of increasing the efficiency of the rendering process by allocating the rendering of game screens regarded as having similar rendering contents to the same CPU.

This embodiment uses method 1 described above by which a GPU for performing the rendering process is determined in accordance with the camera position and coordinate information defining a game screen. In the following description, the generation of game screens to be provided for the five client devices 300*a* to 300*e* is classified into one group and executed by the first GPU 105. Note that the number of game screens (the number of client devices) classified into one group is determined by the processability of the GPU and the capacity of the VRAM. Note also that information of client devices classified into each group can be managed by, for example, adding identification information of the client devices to a table having one group ID, and storing the table in the RAM 103.

In step S602, the CPU 101 executes the rendering order determination process of determining the rendering order of rendering objects contained in all game screens to be rendered, for each group allocated to each GPU.

(Rendering Order Determination Process)

Figure 7:
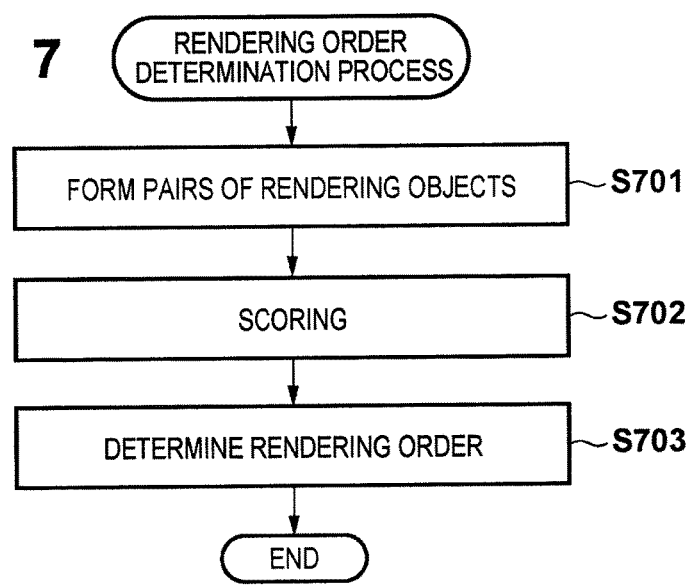
FIG. 7 is a flowchart showing an example of a rendering order determination process of the rendering server 100 according to the embodiment of the present invention.

The rendering order determination process of this embodiment will be explained in detail below with reference to a flowchart shown in FIG. 7. Note that a process of determining the rendering order of rendering objects contained in game screens of one group to be rendered by the first GPU 105 will be explained below, but it will readily be understood that the same process is applicable to other GPUs.

In step S701, the CPU 101 forms pairs of all combinations each including two rendering objects, for all rendering objects contained in game screens of one group to be rendered by the first GPU 105.

In step S702, the CPU 101 scores the coincidence of detailed information of two rendering objects of all the pairs formed in step S701, by using scores obtained by unbalanced allocation by arranging attributes of detailed information in descending order of priority. In this embodiment, the attribute of each data indicated by detailed information is given priority by the following order.

1. Identification information for specifying texture data
2. Identification information for specifying model data
3. Specific information of a rendering program to be used
4. Specific information of data for calculations to be used in the rendering program The priority of the attribute of each data indicated by detailed information is determined in accordance with the data size on a cache memory when the data having the attribute is read out and expanded on the memory. Data having a high-order attribute has a large data size and requires a high switching cost, that is, when this data is switched to different data, it takes a long time to, for example, expand the data on the cache memory, read out the data from the cache memory, and set parameters. That is, the switching cost can efficiently be reduced by performing rendering by a rendering order that decreases the switching frequency (increases the reuse frequency) of data having a high-priority attribute.

More specifically, scoring in this step gives a high score to a pair of rendering objects having a high detailed information coincidence, that is, to a pair of rendering objects by which the switching cost is reduced by increasing the reuse frequency for attribute data having a high priority.

In step S703, the CPU 101 refers to the coincidence scores of all the pairs, and determines the rendering order of all rendering objects contained in game screens of one group to be rendered by the first GPU 105. More specifically, the CPU 101 determines a rendering order that maximizes the total sum of scores for a combination of continuous rendering objects when all the rendering objects are arranged in the rendering order.

A practical rendering order determination procedure will be explained in detail below with reference to an accompanying rendering. To simplify the explanation, a method of determining the rendering order by taking account of the coincidence of texture data and model data, among the four attributes of detailed information described above.

Figure 8:
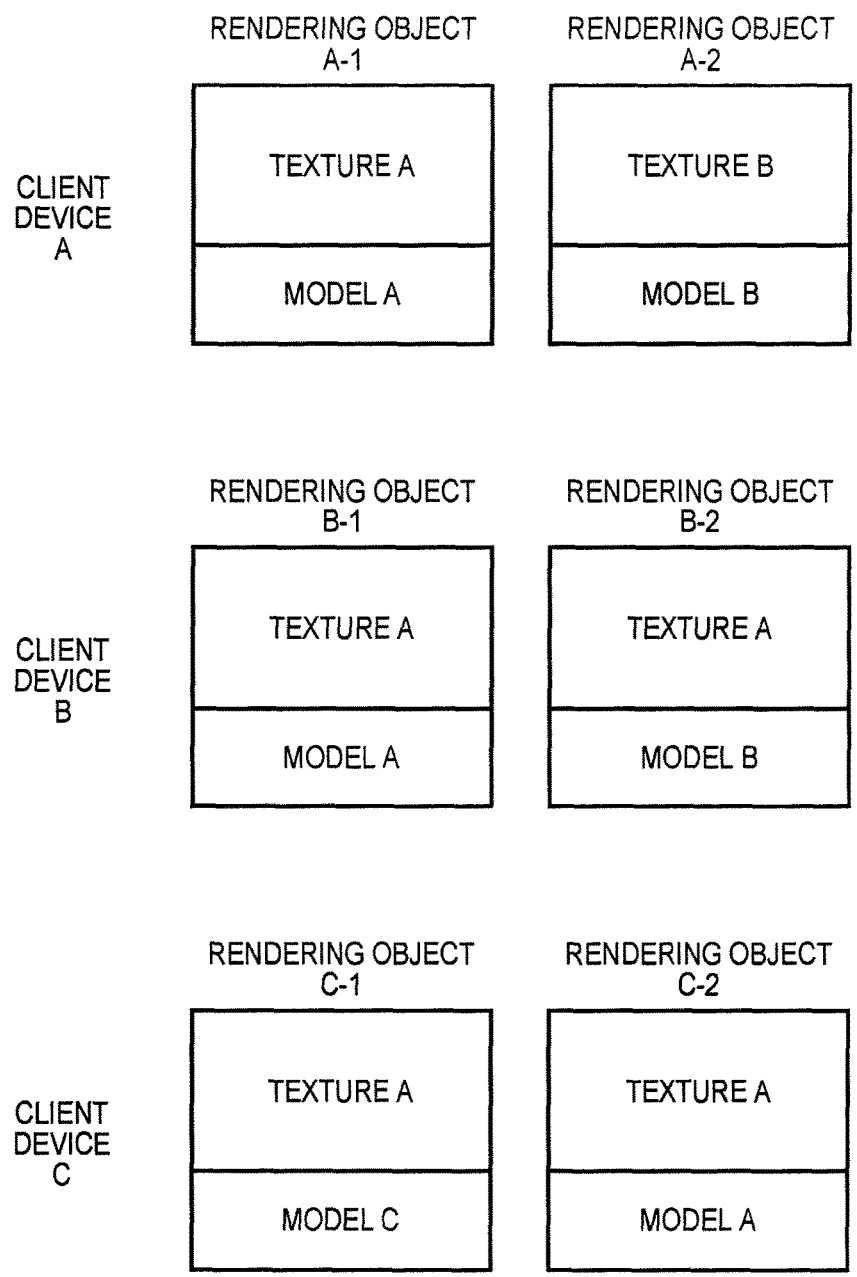
FIG. 8 is a view for explaining the rendering order determination process according to the embodiment of the present invention.

FIG. 8 shows rendering objects contained in a game screen to be provided for each client device, which are used in an example of the rendering object rendering order determination procedure in step S703. In this example shown in FIG. 8, the same GPU generates game screens to be provided for three client devices, and the GPU renders two rendering objects for each game screen, that is, renders a total of six rendering objects.

When the CPU 101 generates pairs of possible combinations of all objects, the number is $_6C_2=15$. That is, the CPU 101 performs coincidence scoring for all the fifteen pairs. In this embodiment, when attributes of detailed information coincide, the score is two points for the coincidence of texture data, and one point for the coincidence of model data. In this case, the scores of these pairs are as shown in FIG. 9.

The CPU 101 first notes pairs having a highest score of 3. In this example, three pairs (A-1, B-1), (A-1, C-2), and (B-1, C-2) have a highest score of 3. In this case, the number of pairs having the highest score is equal to the number of rendering objects (three-point objects) forming the pairs. This demonstrates that all the pairs are formed by three-point objects having the same detailed information. The CPU 101 then refers to the scores of other pairs including each of the three-point objects, and determines the rendering order of the three-point objects.

Figure 9:
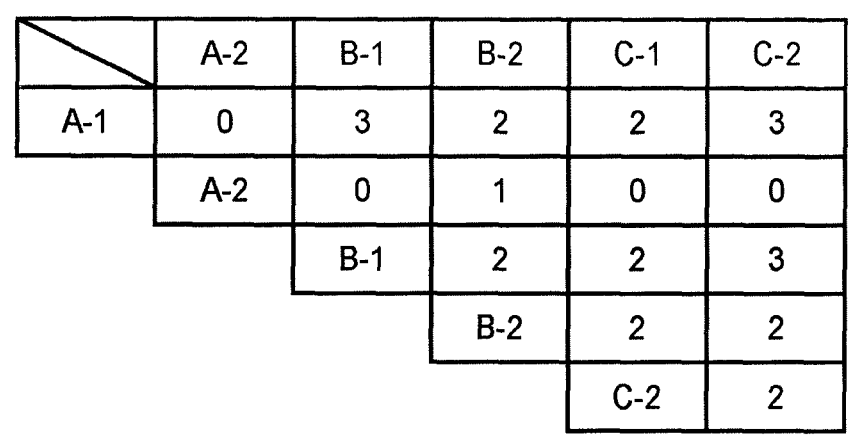

As shown in FIG. 9, the score of another pair including the three-point objects is two as the second highest score or score 0 of a pair with A-2. That is, when allocating a rendering object other than A-2 as a rendering object following the three-point objects in the rendering order, the switching cost remains the same regardless of the rendering object. Therefore, the CPU 101 determines the order based on, for example, the sorting order of identification information, without particularly taking account of the rendering order of the three three-point objects described above.

Note that if there is only one pair having the second highest score, a rendering object included in the pair, among the three three-point objects, is determined as the third, that is, the last in the three-point object rendering order, and the other rendering object included in the pair is allocated as the fourth.

Similarly, the CPU 101 determines the rendering order of rendering objects (two-point objects B-2 and C-1), other than the three-point objects, included in a pair having the second highest score. As shown in FIG. 9, a pair with rendering object A-2 is only the pair including a two-point object and having the second highest score or less. As shown in FIG. 9, only the score of a pair with two-point object B-2 is 1 for rendering object A-2. Of the two-point objects, therefore, rendering object B-2 is determined as the fifth, that is, the last of the two-point objects in the rendering order, and rendering object A-2 is determined as the sixth.

Figure 10:
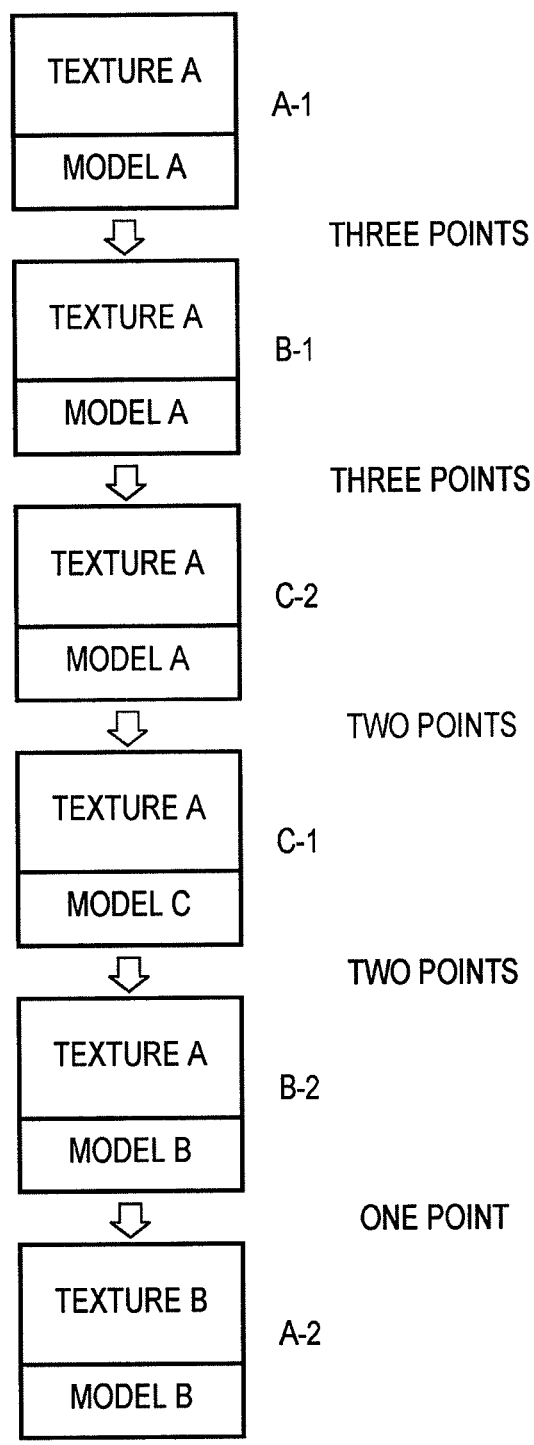
FIG. 10 is a view for explaining a rendering order determined by the rendering order determination process according to the embodiment of the present invention.

By repeating determination as described above, the CPU 101 can determine the rendering order of all rendering objects contained in game screens of one group. In this example, the CPU 101 finally determines A-1→B-1→C-2→C-1→B-2→A-2 as the rendering order as shown in FIG. 10.

In this way, ordinal numbers of the rendering order that reduces the switching cost can be allocated to all rendering objects contained in game screens classified into one group. Note that the ordinal numbers of the rendering order can be allocated by, for example, associating identification information of rendering objects with the rendering order, and storing the result as a list in the RAM 103 or the like.

After the rendering order determination process in step S602 is complete, the CPU 101 renders rendering objects in accordance with the determined rendering order in step S603, thereby generating a game screen to be provided for each client device 300. More specifically, the CPU 101 refers to detailed information of rendering objects in the rendering order, reads out data specified by the detailed information from the recording medium 104, and transfers the data to a GPU for performing rendering. In this process, the CPU 101 reads out and transfers only data different from data already expanded in an expansion area; the CPU 101 does not read out the same data as the already expanded data, and uses the already expanded data instead.

Note that a game screen is generated by using state information containing coordinate information and action information of each rendering object, and game screen rendering range/display setting information including camera parameters. Since the use of these pieces of information is well known as processing contents, an explanation thereof will be omitted.

In step S604, the CPU 101 adds, to the header of a game screen generated by each GPU, identification information of a client device for which the game screen is to be provided, and transmits the game screen to the center server 200 via the communication unit 113.

Since the rendering process can be performed by thus reducing the switching cost, a game screen having high responsiveness to user's operation input can be provided for a user operating a client device.

Note that in this embodiment, "a game screen" is simply transmitted from the center server 200 to the client device 300. Although "a game screen" may be simple still image data, "a game screen" may also be transmitted as frame image data of moving image data to which an encoding process such as interframe prediction that further decreases the data size is applied. The encoding process can, of course, be performed by either the rendering server 100 or center server 200.

Also, in this embodiment, the present invention is explained by taking a massively multiplayer type network game as an example. As described previously, however, the present invention is applicable to an arbitrary apparatus and arbitrary system capable of simultaneously generating screens to be provided for one or more client devices, and is not limited to the above embodiment. For example, when game contents corresponding to a single user are independently provided for each client device in a rendering system, similar game screens may be output to a plurality of client devices. That is, common rendering objects are perhaps contained in game screens provided when the positions or directions on the map are similar, when the statuses of progress of the game are similar, or when the same action is executed. Therefore, the efficiency of the rendering process can be increased by applying the present invention.

Furthermore, the rendering server 100 and center server 200 are separated in the rendering system of this embodiment, but the present invention is not limited to this. That is, the present invention may also be carried out by one server having the functions of both the rendering server 100 and center server 200.

As explained above, the rendering control apparatus of this embodiment can perform an efficient rendering process having high responsiveness in a rendering system that provides a game screen to one or more client devices. More specifically, the rendering control apparatus acquires identification information and detailed information indicating data necessary for rendering, for each of a plurality of rendering objects to be used to generate a screen to be provided for a client device. By referring to detailed information of each of the plurality of rendering objects, the rendering control apparatus determines the rendering order of all the rendering objects so as to allocate consecutive ordinal numbers to rendering objects having at least partial data indicated by the detailed information in common. The rendering control apparatus reads out the data indicated by the detailed information of the rendering objects in accordance with the rendering order, and transfers the data to a GPU. In this case, of the data indicated by the detailed information of rendering objects that are continuous in the rendering order, the rendering control apparatus reads out and transfers only data that are not the same as data already transferred to the GPU.

The processing as described above makes it possible to reduce the time required for the game screen rendering process, and efficiently perform rendering.

[Modification]

In the above-described embodiment, the rendering order determination process of determining the rendering order by making pairs of all combinations of all rendering objects contained in game screens classified into one group and performing scoring on these pairs is explained. In this modification, a method of simply performing scoring by sorting and classifying rendering objects by arranging attributes of detailed information in descending order of priority will be explained.

(Rendering Order Determination Process)

Figure 11:
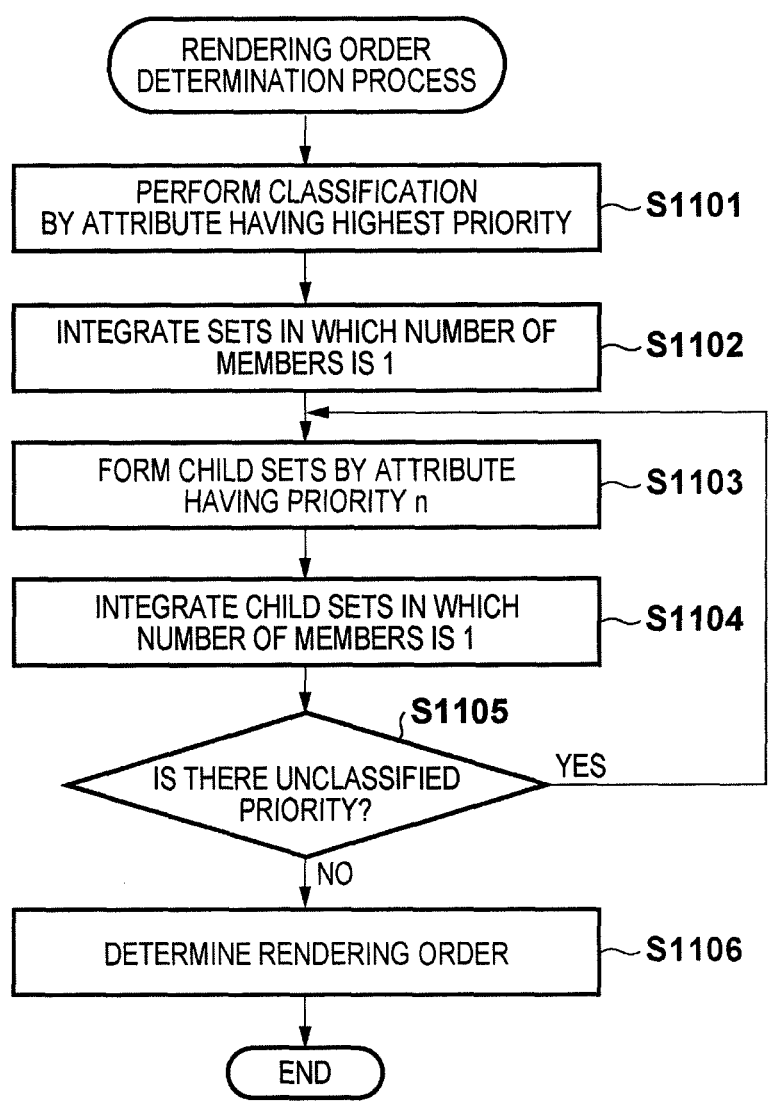
FIG. 11 is a flowchart showing an example of the rendering order determination process of the rendering server 100 according to a modification of the present invention.

The rendering order determination process of this modification will be explained in detail below with reference to a flowchart shown in FIG. 11. Note that a process of determining the rendering order of rendering objects contained in game screens of one group to be rendered by the first GPU 105 will be explained below, but it will readily be understood that the same process is applicable to other GPUs.

In step S1101, for all rendering objects contained in game screens of one group to be rendered by the first GPU 105, the CPU 101 classifies by arranging attributes indicated by detailed information in descending order of priority, based on attribute data having the highest priority. The attribute of each data indicated by detailed information is given priority by the following order in this modification as well.

1. Identification information for specifying texture data
2. Identification information for specifying model data
3. Specific information of a rendering program to be used
4. Specific information of data for calculations to be used in the rendering program That is, in this step, the CPU 101 classifies all rendering objects by identification information for specifying texture data.

In step S1102, the CPU 101 refers to the number of members belonging to each set of rendering objects using the same texture data, which is generated by the classification in step S1101, and specifies sets in which the number of members is 1. Then, the CPU 101 integrates the sets in which the number of members is 1 into one set (a texture non-coincidence set).

In step S1103, the CPU 101 classifies rendering objects in each of the sets of rendering objects using the same texture data and the texture non-coincidence set, by using identification information for specifying model data having the second highest priority. That is, in this step, rendering objects belonging to each of the sets of rendering objects using the same texture data and the texture non-coincidence set are classified into child sets of rendering objects using the same model data.

In step S1104, the CPU 101 refers to the number of members belonging to each set of rendering objects using the same model data, which is generated by the classification in step S1103, and specifies sets in which the number of members is 1. Then, for each of the sets of rendering objects using the same texture data and the texture non-coincidence set, the CPU 101 integrates rendering objects in sets in which the number of members is 1 into one set (a model non-coincidence set).

In step S1105, the CPU 101 determines whether there is an attribute not used in set classification. If there is an attribute not used in set classification, the CPU 101 selects an attribute not used in set classification in priority order, and returns the process to step S1103. That is, the CPU 101 then classifies rendering objects in each of the sets of rendering objects using the same model data and the model non-coincidence set, by using rendering program designating information.

By thus performing steps S1101 and step S1102, and the repetitive processing from steps S1103 to step S1105, it is possible to classify rendering objects for each attribute data indicated by detailed information, and finally classify, into a set, rendering objects having at least partial data of data indicated by detailed information in common.

Note that if the CPU 101 determines in this step that there is no attribute not used in set classification, the CPU 101 advances the process to step S1106.

In step S1106, the CPU 101 determines the rendering order of all rendering objects contained in game screens of one group to be rendered by the first GPU 105. That is, the CPU 101 determines a rendering order that reduces the switching cost, in accordance with information of rendering object classification performed in step S1101 to step S1105.

More specifically, the CPU 101 first selects one set, other than the texture non-coincidence set, from sets classified for "identification information for specifying texture data" having the highest priority. Then, the CPU 101 sequentially selects child sets included in the set, and allocates ordinal numbers of the rendering order to rendering objects in the child sets. In this process, the child sets can be selected by, for example, representing each set by using a binary number, and selecting sets in descending order of binary value. For example, scoring is performed by adding $2^3$ to a set in which rendering objects have the attribute having the second highest priority in common, $2^2$ to a set in which rendering objects have the attribute having the third highest priority in common, $2^1$ to a set in which rendering objects have the attribute having the fourth highest priority in common, and $2^0$ to a set in which rendering objects have the attribute having the lowest priority in common, and the rendering order is determined in descending order of score.

Also, when the rendering order of rendering objects is determined for one set classified for "identification information for specifying texture data", the rendering order is similarly determined for the next set using the same texture data. Furthermore, when the rendering orders of rendering objects are determined for all sets other than the texture non-coincidence set, the rendering order is similarly determined for rendering objects included in the texture non-coincidence set.

Accordingly, rendering orders that reduce the switching cost can be allocated to all rendering objects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of the U.S. Provisional Patent Application No. 61/489,761, filed May 25, 2011, and the benefit of Japanese Patent Application No. 2011-260976, filed Nov. 29, 2011, which is hereby incorporated by reference herein in its entirety.

What is claimed is:

1. A non-transitory computer-readable recording medium storing a program for causing one or more computers, which includes a computer comprising one or more renderers for concurrently executing rendering processing for a plurality of screens, to execute the following processing:

processing for specifying at least two screens as rendering targets of one renderer among the plurality of screens;

processing for identifying necessary data which is needed for each rendering processing of the at least two screens; and processing for determining rendering orders of all the necessary data for the at least two screens in a series of the rendering processing in which the at least two screens are concurrently rendered, such that ordinal numbers of the necessary data having a common attribute are consecutive, wherein the one renderer is configured to perform the series of the rendering processing and to concurrently generate the at least two screens, the at least two screens are provided from the one renderer to at least two client devices, the necessary data is information of rendering objects used for the rendering processing of the at least two screens, the information of the rendering objects includes identification information of each of the rendering objects and detailed information indicating data necessary to render each of the rendering objects, the detailed information including a plurality of attributes which is necessary to render each of the rendering objects, the plurality of attributes being set to different scores respectively, the ordinal numbers are allocated to the rendering objects, of which at least a part of an attribute included in the detailed information is in common, in the processing for determining, and the rendering order is determined based on summations of scores, which are obtained by adding scores of common attributes for a combination of two rendering objects, in the processing for determining.

2. The non-transitory computer-readable recording medium according to claim 1, wherein screens, in which a predetermined condition related to rendering is common, are specified as the at least two screens in the processing for specifying.

3. The non-transitory computer-readable recording medium according to claim 2, wherein the predetermined condition is at least one of a camera parameter that defines a rendering range, an attribute of a rendering object in the rendering range, an event information occurred in a game content according to the screens, and progress status in the game content.

4. The non-transitory computer-readable recording medium according to claim 1, wherein the ordinal numbers are preferentially allocated to ones of the rendering objects, which have a high-priority attribute in common, in the processing for determining.

5. The non-transitory computer-readable recording medium according to claim 4, wherein a higher priority is set to an attribute in which an amount of data corresponding to the attribute is larger.

6. The non-transitory computer-readable recording medium according to claim 1, wherein
the ordinal numbers are preferentially allocated to ones of the rendering objects, in which a number of common attributes is large, in the processing for determining.

7. The non-transitory computer-readable recording medium according to claim 1, wherein the rendering order is determined such that a higher ordinal number is allocated to rendering objects in which a combination of the rendering objects has a higher summation.

8. The non-transitory computer-readable recording medium according to claim 1, wherein the program causes the one or more computers to execute processing for reading out the necessary data based on the rendering order.

9. The non-transitory computer-readable recording medium according to claim 1, wherein, in the determined rendering orders, consecutive ordinal numbers are determined to the necessary data for different screens.

10. An information processing apparatus, comprising:
a processor; and
a memory including a set of instructions that, when executed by the processor, causes the processor to perform operations including:
specifying at least two screens as rendering targets of one renderer among a plurality of screens which are concurrently rendered;
identifying necessary data which is needed for each rendering processing of the at least two screens; and
determining rendering orders of all the necessary data for the at least two screens in a series of the rendering processing in which the at least two screens are concurrently rendered, such that ordinal numbers of the necessary data having a common attribute are consecutive,
wherein the one renderer is configured to perform the series of the rendering processing and to concurrently generate the at least two screens,
the at least two screens are provided from the one renderer to at least two client devices,
the necessary data is information of rendering objects used for the rendering processing of the at least two screens,
the information of the rendering objects includes identification information of each of the rendering objects and detailed information indicating data necessary to render each of the rendering objects, the detailed information including a plurality of attributes which is necessary to render each of the rendering objects, the plurality of attributes being set to different scores respectively,
the ordinal numbers are allocated to the rendering objects, of which at least a part of an attribute included in the detailed information is in common, in the determining, and
the rendering order is determined based on summations of scores, which are obtained by adding scores of common attributes for a combination of two rendering objects, in the determining.

11. A method of controlling an information processing apparatus, comprising:
specifying at least two screens as rendering targets of one renderer among a plurality of screens which are concurrently rendered;
identifying necessary data which is needed for each rendering processing of the at least two screens; and
determining, with a processor, rendering orders of all the necessary data for the at least two screens in a series of the rendering processing in which the at least two screens are concurrently rendered, such that ordinal numbers of the necessary data having a common attribute are consecutive,
wherein the one renderer is configured to perform the series of the rendering processing and to concurrently generate the at least two screens,
the at least two screens are provided from the one renderer to at least two client devices,
the necessary data is information of rendering objects used for the rendering processing of the at least two screens,
the information of the rendering objects includes identification information of each of the rendering objects and detailed information indicating data necessary to render each of the rendering objects, the detailed information including a plurality of attributes which is necessary to render each of the rendering objects, the plurality of attributes being set to different scores respectively,
the ordinal numbers are allocated to the rendering objects, of which at least a part of an attribute included in the detailed information is in common, in the determining, and
the rendering order is determined based on summations of scores, which are obtained by adding scores of common attributes for a combination of two rendering objects, in the determining.

* * * * *